United States Patent [19]
Milnes et al.

[11] Patent Number: 5,812,205
[45] Date of Patent: Sep. 22, 1998

[54] AUTOMATIC TIME SET IN A TELEVISION SYSTEM

[75] Inventors: Kenneth Alan Milnes, Fremont, Calif.; Jeffrey J. Kochy, Ashland, Oreg.; Constantine Sokolik, Redwood City; Henry Perkins, III, Santa Clara, both of Calif.

[73] Assignee: Starsight Telecast Incorporated, Fremont, Calif.

[21] Appl. No.: 505,123

[22] Filed: Jul. 21, 1995

Related U.S. Application Data

[63] Continuation-in-part of Ser. No. 243,598, May 13, 1994, Pat. No. 5,619,274, which is a continuation-in-part of Ser. No. 239,225, May 4, 1994.

[51] Int. Cl.[6] ............................. H04N 7/00; H04N 7/08
[52] U.S. Cl. ..................... 348/460; 348/906; 348/478; 348/466
[58] Field of Search ................................ 348/460, 478, 348/12, 13, 906, 466; 455/3.1, 3.2

[56] References Cited

U.S. PATENT DOCUMENTS 5,559,550  9/1996  Mankovitz .
5,619,274  4/1997  Roop et al. ........................... 348/461

Primary Examiner—Victor R. Kostak
Attorney, Agent, or Firm—Christie, Parker & Hale, LLP

[57] ABSTRACT

The present invention provides a method and apparatus for automatically setting the time in a peripheral device (170) in a television system (10). In the preferred embodiment, a datastream (300) with packets of data (310–313) is broadcast to the peripheral device (170). A time value (400) within the received datastream (300) is used to set the time within the peripheral device (170). The data within the received datastream (300) also contains a cyclic redundancy check (410) which is used to determine when an error is present in the received data packet (310). The time is set in the peripheral device (170) only when the cyclic redundancy check has found no errors in the data packet (310). When needed, additional values within the received packet (310) can later be used to correct the time which has been set in the peripheral device (170).

30 Claims, 5 Drawing Sheets

AUTOMATIC TIME SET IN A TELEVISION SYSTEM

CROSS REFERENCE TO RELATED APPLICATIONS

This application is a continuation-in-part of U.S. patent application Ser. No. 08/243,598, filed May 13, 1994 now U.S. Pat. No. 5,619,274, which was a continuation-in-part of U.S. patent application Ser. No. 08/239,225, filed May 4, 1994 (pending), both of which are incorporated herein by reference in their entirety for all purposes.

BACKGROUND OF THE INVENTION

The present invention relates to automatically setting the time in a peripheral device within a television system, and more particularly to automatically obtaining a time value from a datastream and using that time value to set the time within a peripheral device in a television system.

The Electronic Industries Association (EIA) provides a standard for recommended teletext practice. This standard sets forth formats for (1) data transmission and wave forms, (2) data packets, (3) data groups, and (4) teletext records. Both EIA-516, approved Mar. 31, 1988, and draft EIA-608, dated Apr. 15, 1994, are hereby incorporated by reference for all purposes.

Extended Data Services (EDS) is one of the standards recommended by EIA. EDS provides a public standard datastream that includes a time value. This publicly-available time standard can be used to set the time in a peripheral device within a television system. The EDS datastream is provided on one VBI line (e.g., line 21), and the EDS datastream does not contain any cyclic redundancy check. Unfortunately, the EDS public standard is not available to many consumers. For example, it is not required to be carried by all television broadcast stations or networks and the EDS data priority is secondary to the closed caption data.

SUMMARY OF THE INVENTION

The present invention provides a method and apparatus for automatically setting the time in a peripheral device in a television system. The peripheral device can be, for example, a television or a VCR. A datastream with packets of data is broadcast to the peripheral device. A time value located in the received datastream is used to set the time within the peripheral device.

In the preferred embodiment, the data within the received datastream contains a cyclic redundancy check (CRC) along with the time value. The CRC is used to detect errors in the data packet. After the first byte in the received data packet is identified, the CRC is used to determine an error indicating value. If the correct CRC based value is determined (i.e., indicating no error is present in the data packet), then the time value is stored in a memory located within the peripheral device. The time value is then used to set a time in the peripheral device. When needed, additional values within the received data packet can then be used to correct the time which has been set in the peripheral device.

A further understanding of the nature and advantages of the invention may be realized by reference to the remaining portions of the specification and the drawings.

DESCRIPTION OF THE PREFERRED EMBODIMENT

Figure 1:
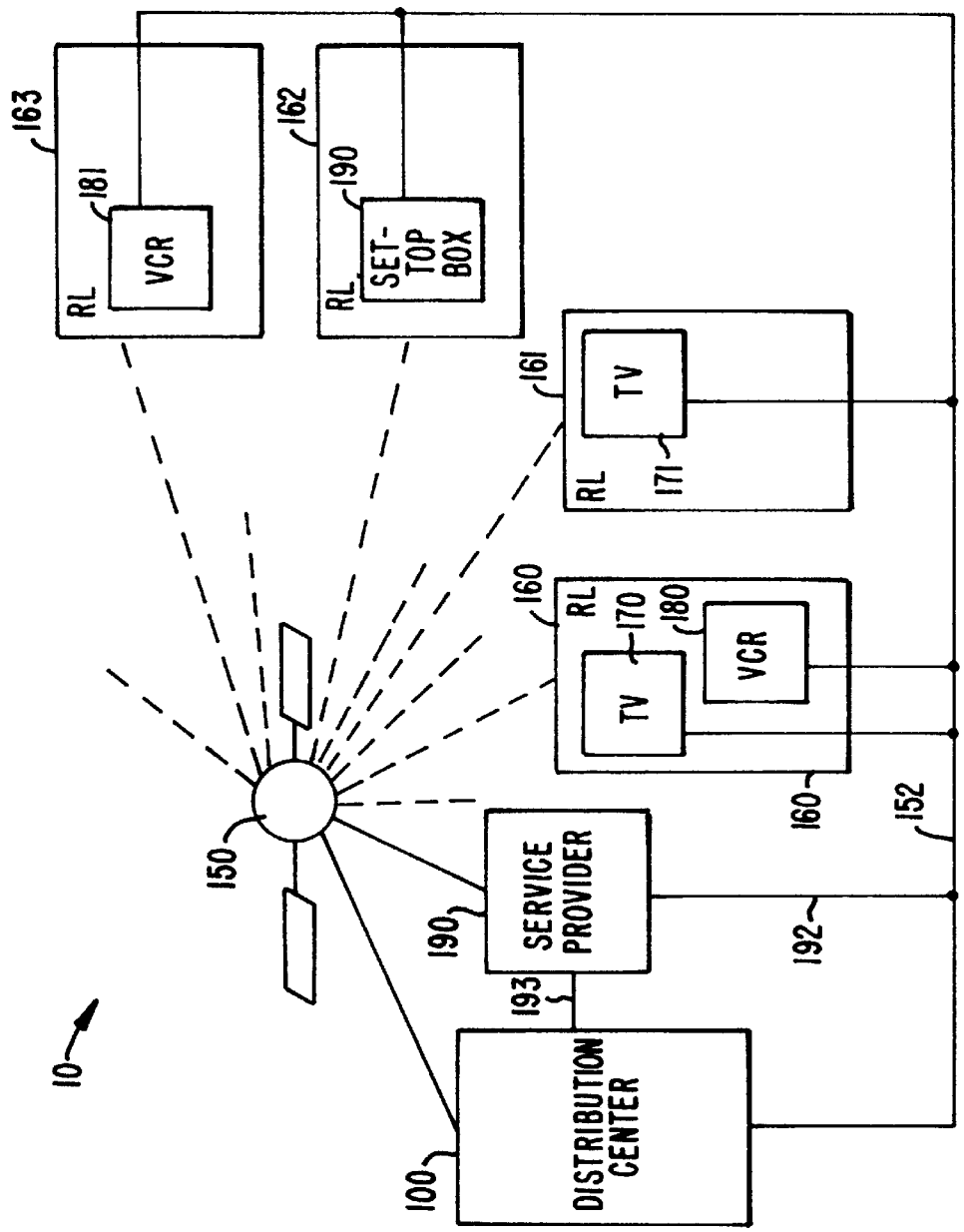
FIG. 1 illustrates a television system with a distribution center and multiple receiving locations.

FIG. 1 illustrates a television system with a distribution center and multiple receiving locations. Television system 10 includes distribution center 100 which compiles data for a datastream. This datastream includes a packet of data with a time set value. In the preferred embodiment, this datastream is broadcast to receiving locations 160–163. The present invention provides for several methods of broadcasting the datastream from distribution center 100 to receiving locations 160–163. For example, satellite 150 may broadcast this datastream within the vertical blanking interval (VBI) of a television channel (e.g., PBS) to receiving locations 160–163. In another embodiment, the datastream is provided to receiving locations 160–163 via transmission line 152. Transmission line 152 may be, for example, optical fiber, coax cable, telephone line, or the like.

In the preferred embodiment, the data also provides television schedule information. This television schedule information is then used for the generation of a television schedule guide. If the television schedule guide is in a grid format, then, for example, the available channels can be listed on the "y" axis and various times can be listed on the "x" axis. In this arrangement, the times listed on the "x" axis are related to the time stored in the peripheral device generating the television schedule guide. Thus, maintaining the current time within the peripheral device is desirable.

After the datastream is received in one of the receiving locations 160–163, the time set value located within the datastream is used to automatically set a time in one or more of the peripheral devices within receiving locations 160–163. The peripheral devices may be television 170, television 171, VCR 180, VCR 181, and/or set-top box 190. Software located within these devices utilize information provided in the datastream to perform the steps needed to automatically set a time. An automatic time set provides a consumer with the luxury of not having to set and/or update the time in, for example, a VCR. Usually, the time in a peripheral device needs to be set and/or updated after a power outage, a change in daylight savings time, and the like.

The time setting function is particularly useful when television schedule information is being displayed and/or utilized. In the preferred embodiment, the initial television schedule information display is centered around the current time. For example, if the current time is 7:45 p.m., the initial display would include television programs available from 7:00 p.m. to 10:00 p.m. A user may be able to shift the display to include programs available at different times after this initial display. The time set can also be used for delayed tuning and/or recording. For example, if a user selects a future program for viewing, the present invention automatically tunes to the channel carrying that future program at the correct time. In order to determine the correct time, the schedule time for the selected program is compared to the time set in the peripheral device. Similarly, if a user selects a future program for recording, the present invention automatically records that future program. In this situation, at the correct time, 1) the VCR is turned on, 2) the television is tuned to the desired program, and 3) the VCR record feature is initiated. The end time of the program is then compared to the time set in the peripheral device, and when the end time matches the current time, the VCR record feature is disengaged and the VCR is turned off.

After the initial time is set in a peripheral device, the time may need to be correct for time zone differences, daylight savings time differences, and the like. In one embodiment of the present invention, each of the receiving peripheral devices 170, 171, 180, 181, and 190 receives the datastream from, for example, a local service provider 190 which monitors the time zone, etc. for each receiving peripheral device 170, 171, 180, 181 and 190. Service provider 190 initially receives the datastream from distribution center 100 via line 193. In this arrangement, information needed for time correction (i.e., to compensate for different time zones, daylight savings time, etc.) is placed in the received datastream by the local service provider 190. This information (and the datastream) is then broadcast to peripheral devices when a time correction is needed. Broadcasting can be done via satellite 150 (or another satellite), or via lines 192 and 152.

In an alternative embodiment, distribution center 100 may monitor the time zone, daylight savings time, and other time related information for particular receiving devices. In this embodiment, distribution center 100 inserts time correction related address information into the datastream. This address information is then extracted and used by the peripheral devices identified by the special address. These peripheral devices use the time correction address information for time correction based on time zone, daylight savings time, and the like.

Figure 2:
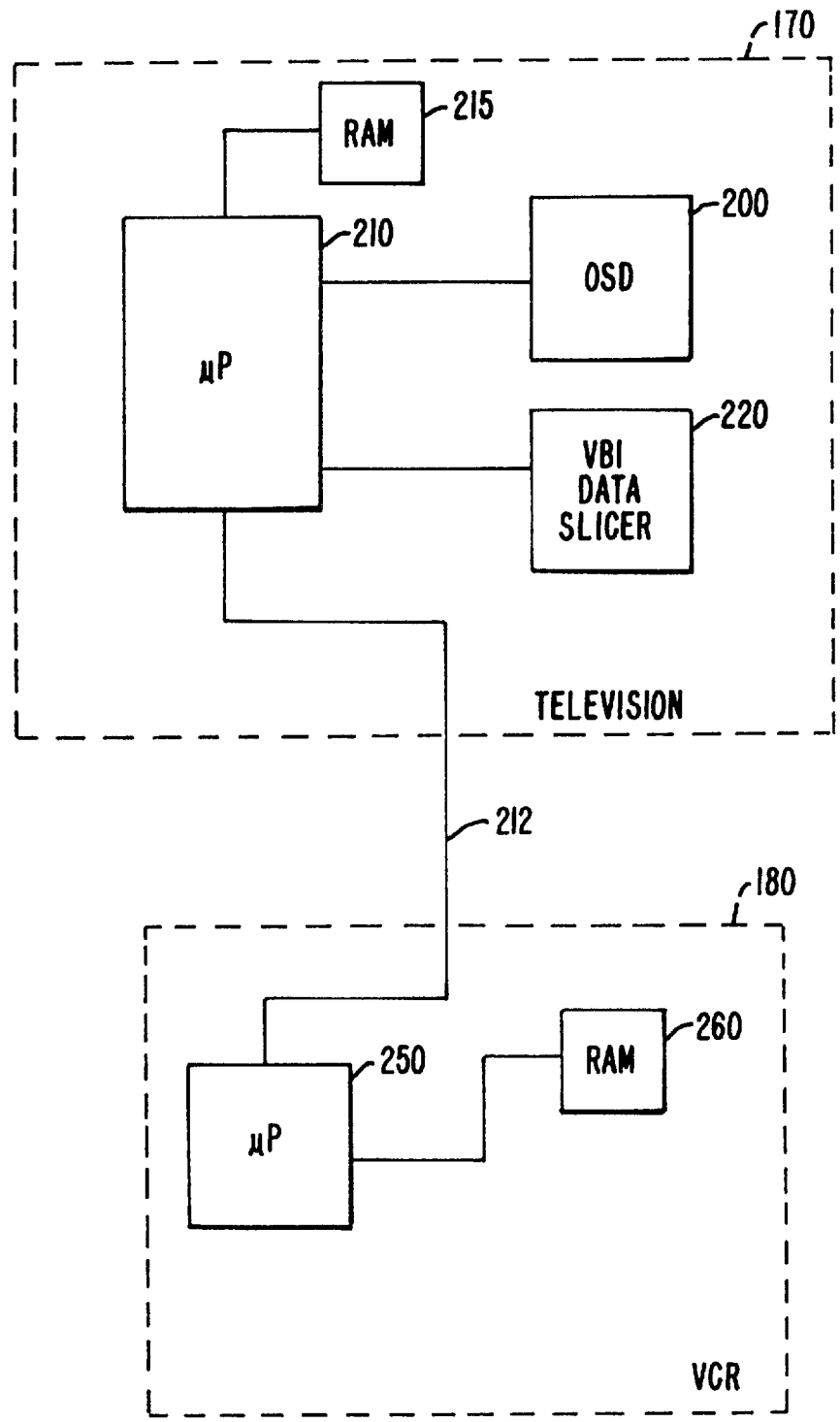
FIG. 2 shows configurations for a television and a VCR located within the television system.

FIG. 2 shows configurations for a television and a VCR located within the television system. Television 170 receives the datastream, for example, within the VBI of a television signal provided by satellite 150. VBI data slicer 220 is then used to extract the datastream from data provided on that television signal. On-screen display (OSD) 200 is used, in this embodiment, to view the time which is set within either television 170 and/or VCR 180. Microprocessor 210 contains the software needed for the automatic time set feature. In this arrangement, values, including the time value, within the datastream can be stored in RAM 215. Microprocessor 210 also includes an interface which allows for connection via line 212 to VCR 180. Microprocessor 250 located within VCR 180 may also include the software needed for the automatic time set feature. RAM 260 is used for storing the time value when it is used by VCR 180.

When the datastream with the time value is received, the time value is not used if the packet time stamp is earlier than the time stamp which is already located within the peripheral device receiving the datastream. Thus, only later times are accepted, and stale data is not used by television 170 and/or VCR 180. The software located within microprocessor 210 includes a sequence for time value extraction and a translation program for translating the time value into a readable format (i.e., hour:minute:second).

Figure 3:
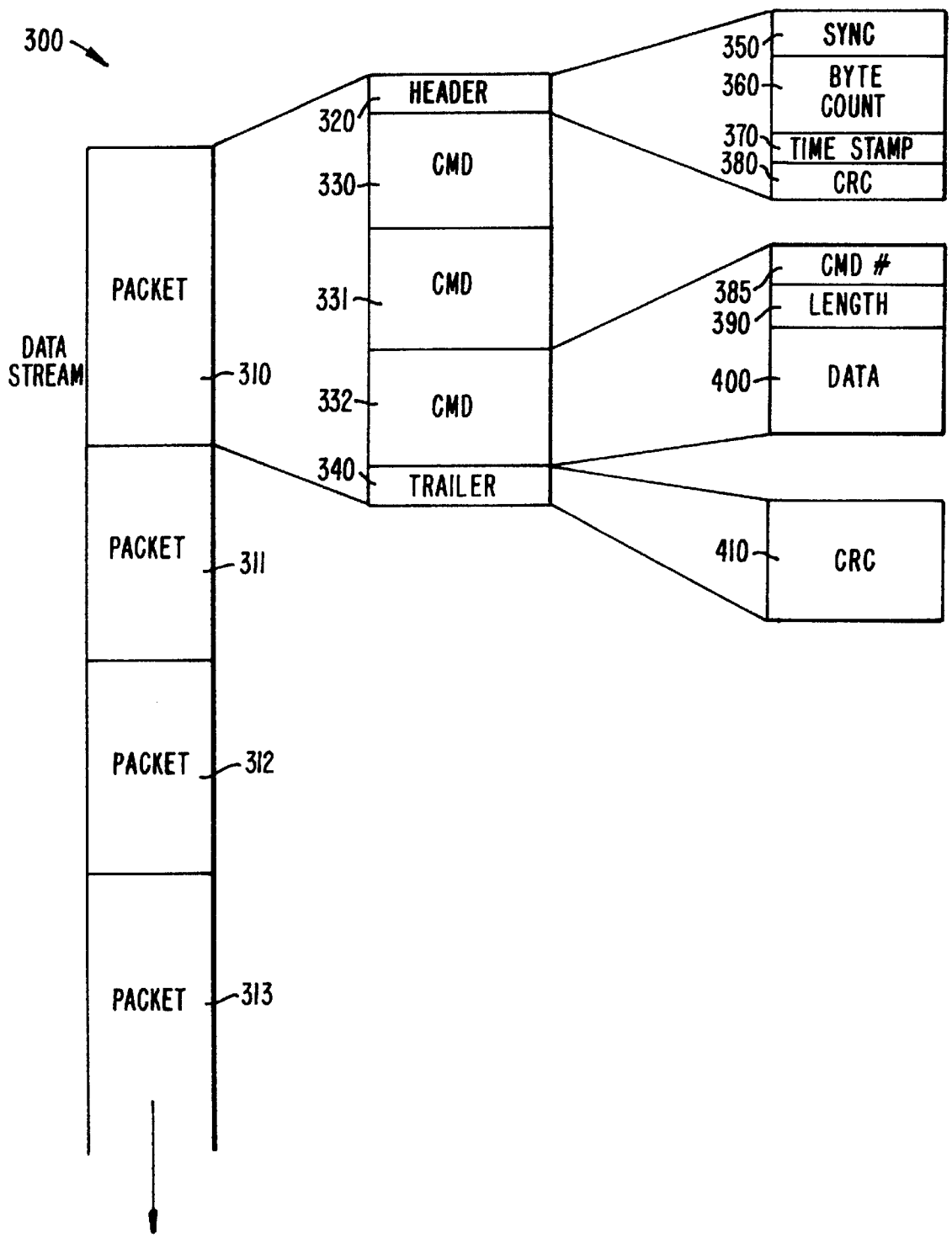
FIG. 3 illustrates a datastream with multiple packets of data.

FIG. 3 illustrates a datastream with multiple packets of data. In the preferred embodiment, datastream 300 includes packets 310–313, and the first packet 310 contains a header 320, commands 330–332, and trailer 340. Header 320 is the first portion of packet 310 provided by VBI data slicer 220, and trailer 340 is the last portion of packet 310 provided by VBI data slicer 220. Header 320 includes synchronization field 350, byte count field 360, time stamp field 370, and cyclic redundancy check (CRC) 380. Synchronization field 350 includes a code number indicating the start of packet 310. Microprocessor 210 uses this code number to find the beginning of packet 310. Byte count 360 contains the total number of bytes in packet 310. The total number of bytes includes synchronization field 350, byte count field 360, time stamp field 370, CRC 380, commands 330–332, and CRC 410. Accordingly, microprocessor 210 uses byte count 360 to determine when packet 310 ends.

Time stamp field 370 is used by microprocessor 210 to check for stale data as described above. In the preferred embodiment, time stamp field 370 includes a four-byte time stamp which reveals the minute the packet was transmitted. The time stamp is encoded as minutes after, for example, Jan. 1, 1992, and rounded up or down to the nearest minute boundary. Since packet headers are not guaranteed to be transmitted on minute boundaries, the maximum error of this field is up to ±30 seconds. Time stamp field 370 is also used by peripheral devices within television system 10 to differentiate datastreams on recorded mediums (e.g., VCR tapes) from live datastreams. For example, if a VCR tape recorded a time associated with the beginning of a recorded television show, the VCR would not later use that recorded time from the VCR tape to reset its internal time.

In the preferred embodiment, CRC 380 checks for errors within header 320. For example, an error occurs when one of the bits within packet 310 is inverted. In the preferred embodiment, CRC field 380 includes the least significant word (16 bits) of a 32-bit cyclic redundancy code (CRC 410) value for header 320. CRC 380 is computed over the synchronization field 350 and byte count field 360. CRC 380 is stored least significant byte first.

Command 332 contains, for example, command number field 385, length field 390 and data field 400. Thus, command 332 is the information-bearing portion of packet 310. In this example, command 332 is the time command. Therefore, command number field 385 identifies this command as a time command to processor 210. Length field 390 provides the number of bytes in command 332 (i.e., the total number of bytes in the command number field 385, the length field 390, and the data field 400). Data field 400 provides the time value. In the preferred embodiment, this time value is the current time of day and date encoded as the number of minutes after midnight, Jan. 1, 1992. The time of day and date is provided in, for example, Greenwich Mean Time (GMT). Data field 400 also includes a daylight savings flag, negative offset flag, default offset, and time seconds. The daylight savings flag, negative offset flag, and default offset are used when a time correction is needed.

The daylight savings flag indicates if Daylight Savings Time is in effect for the particular receiving peripheral device. In the preferred embodiment, this flag contains a value whether or not the particular time zone uses Daylight Savings Time. For example, if the flag is 0, then Daylight Savings Time is not in effect, and if the flag is 1, then Daylight Savings Time is in effect. Therefore, this flag is only used when it is 1.

The negative offset flag is a sign bit for the default offset. If the negative offset flag is set, then it indicates that the time zone offset is negative and should be subtracted from the GMT (GMT is the time previously determined from the time value). This occurs in areas west of the Greenwich Meridian (e.g., the United States and Canada). Thus, the time zone offset field is not a two's complement binary number.

The default offset data is within a four-bit field. This data indicates the number of hours offset from GMT to the time zone of the particular receiving peripheral device. Thus, the default offset data is used when a time zone correction is needed.

The time seconds data is the low order seconds part of the current time. The resolution of this field is seconds past the minute. Thus, the range can be 0 to 59, inclusive. In order to minimize jitter in the minute count within a receiving peripheral device, the range for this field can be between 20 and 40, inclusive.

Trailer 340 includes CRC 410 which checks for errors in packet 310, just as CRC 380 checks for errors in header 320. In the preferred embodiment, CRC 410 is a 32-bit cyclic redundancy check value. CRC 410 is computed over synchronization field 350, byte count 360, CRC 380 and commands 330–332. In the preferred embodiment, the CRC 410 generator polynomial=$X^{32}+X^{26}+X^{23}+X^{22}+X^{16}+X^{12}+X^{11}+X^{10}+X^{8}+X^{7}+X^{5}+X^{4}+X^{2}+X^{1}+1$. CRC 410 is stored least significant byte first. If CRC 410 is incorrectly calculated, the wrong value may be mistaken as a time value. Thus, it is critical that the correct mathematical polynomial be used to generate the values which indicate whether or not errors are present in packet 310.

Commands 330 and 331 contain other unrelated commands, as do packets 311–313. Thus, datastream 300 is a multipurpose datastream. CRC 380 can be used for gaining access to the commands 330–332 within packet 310. Therefore, in effect, a decrypting of CRC 380 is required in order to obtain the time value located within data 400 along with the unrelated data located in commands 330–332.

The software located within microprocessor 210 is capable of extracting the various values within data 400 and using those values to set the correct time within television 170. Therefore, software within 210 decodes the datastream in order to get the required time-related data. First, the software searches datastream 300 for the synchronization byte 350. Second, a mathematical polynomial is used to extract error data from CRC 380. Third, the time-related values within data 400 are extracted and used to calculate the current time. In the preferred embodiment, the time value includes information such that an offset time in minutes and seconds can be determined.

Figure 4:
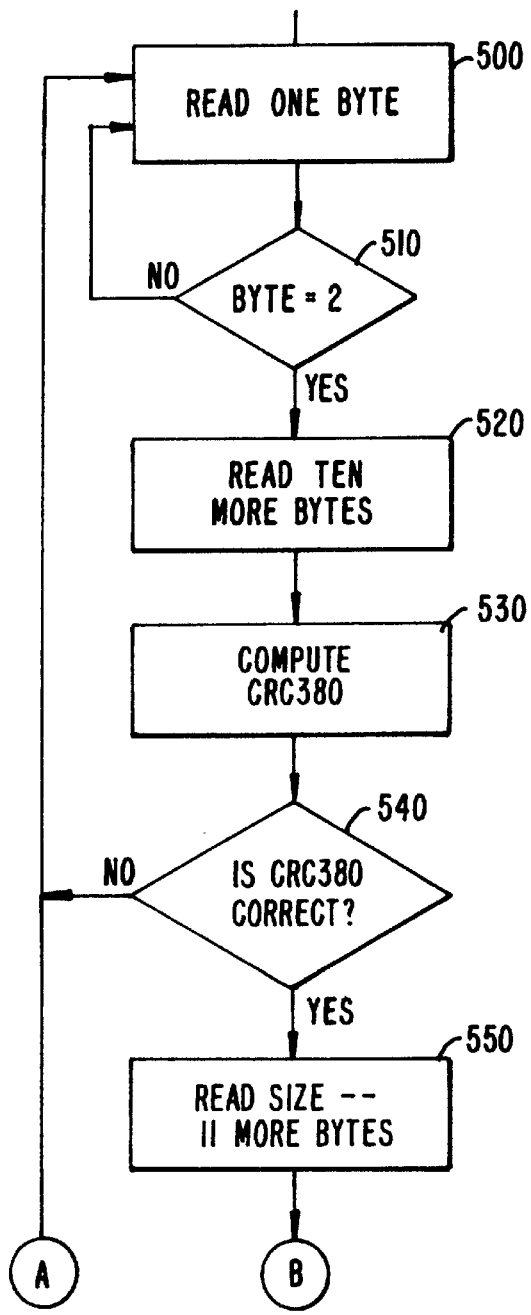
FIGS. 4–6 illustrate a process for the automatic time set within a television system.
Figure 5:
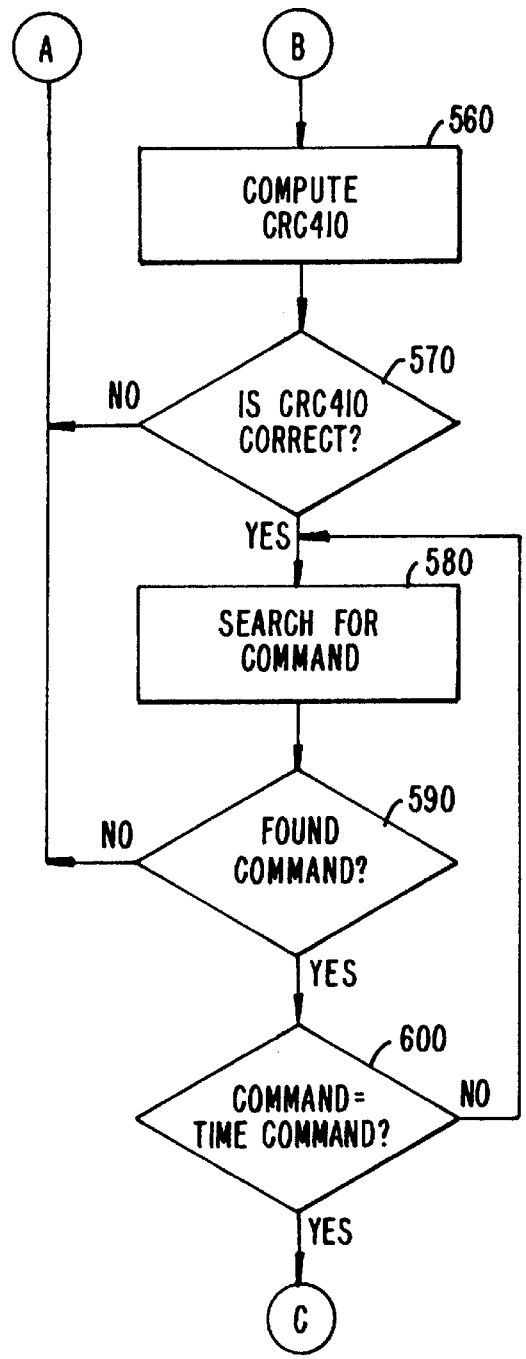
Figure 6:
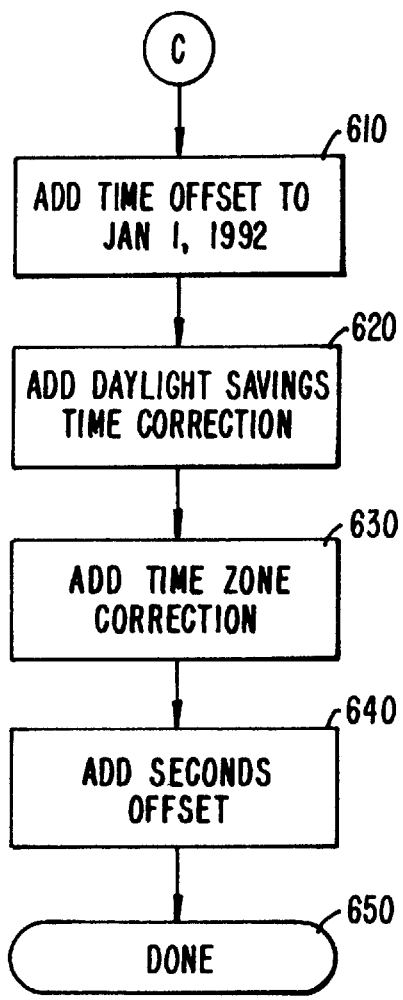

FIGS. 4–6 illustrate a process for the automatic time set within the television system. In the preferred embodiment, the software located within microprocessor 210 begins by reading one byte 500 from the received datastream 300 provided by VBI data slicer 210. This is done in order to search datastream 300 for the synchronization byte within synchronization field 350. In this example, the synchronization byte equals 2. Thus, at step 510 when the byte equals 2, the byte count 360 is read, and when the byte does not equal 2, another byte is read at step 500. After the byte count 360 is read, the software reads, for example, 10 more bytes (see step 520) in order to reach CRC 380. The software then computes an error detecting value at step 530. At step 540, the software checks to see if CRC 380 is correct (i.e., no error is detected). If CRC 380 is not correct, the software returns to reading one byte in search of the synchronization byte at step 500. If the correct CRC 380 is found, the full size of packet 310 is read in order to reach CRC 410. In this example, eleven more bytes are read in order to reach CRC 410 (see step 550).

At step 560, CRC 410 is computed. As stated above, a mathematical polynomial is used for this computation. If CRC 410 is not correct, the system returns to step 500. If CRC 440 is correct, the system moves from step 570 to step 580, and the software then searches for a command 330, 331 or 332 within packet 310. At step 590, the software returns to step 500 if no command is located within the packet.

If a command is found, the software moves on to step 600. At step 600, the system uses command number 380 to determine if the command which was detected at step 590 is the time command. If the command is not the time command, the software returns to step 580 and searches again for a command. If the command is the time command, the time offset located in data 400 is added to Jan. 1, 1992 in step 610. The daylight savings flag within data 400 is read, and, if needed, a daylight savings time correction is added at step 620. If the negative offset flag within data 400 is present, then the default offset is used such that a time zone correction is added to the newly-calculated time at step 630. Finally, the offset for seconds, located in data 400, is added to the time at step 640. The process is complete at step 650.

Figure 7:
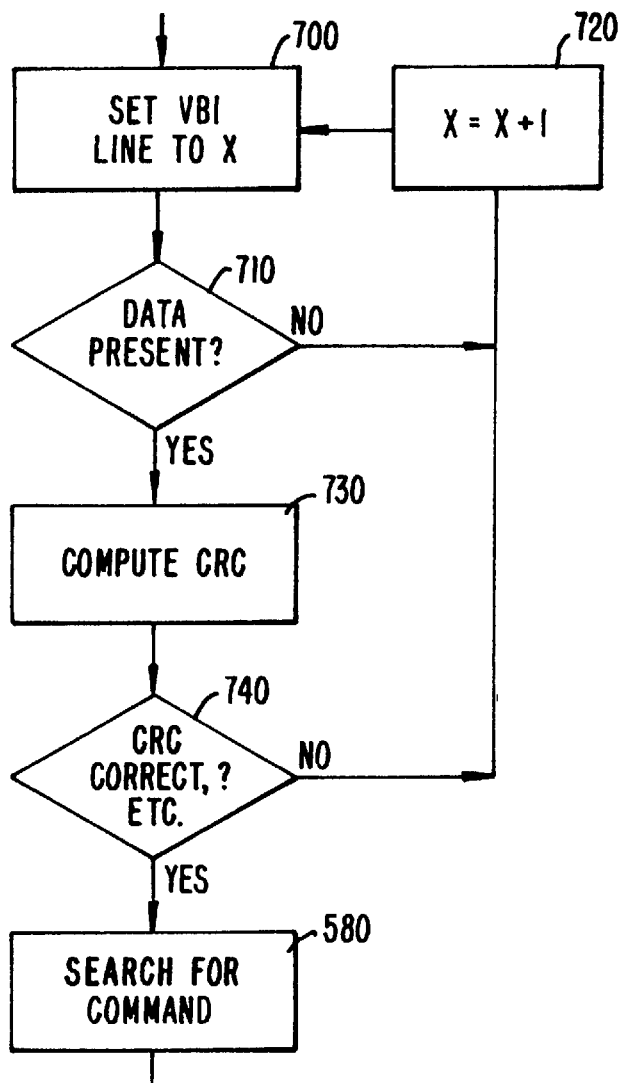
FIG. 7 illustrates a process for finding the VBI line which contains a datastream with time set data.

In another embodiment of the present invention, software is used to determine which VBI line contains the desirable datastream. FIG. 7 illustrates a process for finding the VBI line which contains a datastream with time set data. In the preferred embodiment, multiple VBI lines are utilized to provide this datastream. The process begins by setting the VBI line to a predetermined number (e.g., line 14) which is represented by X in step 700. At step 710, the process checks for data. If no data is present the predetermined number is incremented by, for example, 1 (see step 720), and then the process returns to step 700. Thus, the next VBI line (e.g., line 15) is set. If data is present at step 710, then the CRC is computed at step 730. At step 740, the CRC is checked for correctness. This step 740 corresponds with steps 540–570 in FIGS. 4 and 5. If the CRC is not correct, the process moves on to the next VBI line (see steps 720 and 700). If the CRC is correct, the process follows the same format as set forth in FIGS. 5 and 6 (see. steps 580–650). Therefore, the software finds the VBI line containing the datastream with the time set data.

While a full and complete disclosure of the invention has been provided hereinabove, it will be apparent to those skilled in the art that various modifications and changes may be made.

What is claimed is:

1. A method for automatically setting the time in a television system with television schedule data, comprising the steps of:

broadcasting a datastream with at least one data packet to a peripheral device, said datastream containing said television schedule data, said peripheral device being within said television system, said data packet including a cyclic redundancy check and a time value, said cyclic redundancy check capable of indicating errors in said data packet;

searching for a VBI line containing said datastream;

identifying a first byte in said data packet with a processor after said VBI line containing said datastream is found, said processor being located in said peripheral device;

utilizing said cyclic redundancy check to determine if said data packet contains an error, said utilizing of said cyclic redundancy check occurring after said first byte is identified;

storing said time value in a memory when said data packet is free of errors, said memory being located in said peripheral device;

setting a time in said peripheral device with said processor, said processor using said time value stored in said memory to set said time;

storing a portion of said television schedule data in said memory; and generating a television schedule guide with said television schedule data, said time being used in said generation of said television schedule guide.

2. The method for automatically setting the time in a television system with television schedule data of claim 1, further comprising the steps of:

storing a time correction value in said memory when said data packet is free of errors; and altering said time in said peripheral device with said processor, said processor using said time correction value stored in said memory to alter said time.

3. The method for automatically setting the time in a television system with television schedule data of claim 1, further comprising the step of compiling said datastream with at least one data packet in a distribution center, said datastream containing said television schedule data in said at least one data packet.

4. The method for automatically setting the time in a television system with television schedule data of claim 1, further comprising the steps of:

displaying said time on a television; and displaying said television schedule guide on said television.

5. A method for automatically setting the time in a television system, comprising the steps of:

broadcasting a datastream with at least one data packet to a peripheral device, said peripheral device being within said television system, said data packet including a cyclic redundancy check and a time value, said cyclic redundancy check capable of indicating errors in said data packet;

searching for a VBI line containing said datastream;

identifying a first byte in said data packet with a processor after said VBI line containing said datastream is found, said processor being located in said peripheral device;

utilizing said cyclic redundancy check to determine if said data packet contains an error, said utilizing of said cyclic redundancy check occurring after said first byte is identified;

storing said time value in a memory when said data packet is free of errors, said memory being located in said peripheral device; and setting a time in said peripheral device with said processor, said processor using said time value stored in said memory to set said time.

6. The method for automatically setting the time in a television system of claim 5, further comprising the steps of:

storing a time correction value in said memory when said data packet is free of errors; and altering said time in said peripheral device with said processor, said processor using said time correction value stored in said memory to alter said time.

7. The method for automatically setting the time in a television system of claim 6, wherein said time correction value includes at least one of a daylight savings flag, a negative offset flag, and a default offset.

8. The method for automatically setting the time in a television system of claim 6, wherein said time correction value is related to daylight savings time variations and local time zones variations.

9. The method for automatically setting the time in a television system of claim 5, further comprising the step of compiling said datastream with at least one data packet in a distribution center.

10. The method for automatically setting the time in a television system of claim 5, wherein said peripheral device is at least one of a television, a VCR, and a set-top box.

11. The method for automatically setting the time in a television system of claim 5, further comprising the step of displaying said time on a television.

12. The method for automatically setting the time in a television system of claim 5, wherein said datastream includes a synchronization field for indicating a beginning of said data packet.

13. The method for automatically setting the time in a television system of claim 5, wherein said datastream includes a time stamp field, and further comprising the step of ignoring said time value when said time stamp field contains a stale time.

14. The method for automatically setting the time in a television system of claim 5, wherein said broadcasting is done with at least one of a satellite, a coax cable, a fiber optic cable, and a telephone line.

15. The method for automatically setting the time in a television system of claim 5, wherein said broadcasting is done by using the VBI provided within a satellite transmitted television channel.

16. The method for automatically setting the time in a television system of claim 5, wherein said utilizing of said cyclic redundancy check includes calculating a error value from said cyclic redundancy check with a polynomial.

17. A television system with automatic time set capability, comprising:

a distribution center for compiling and broadcasting at least a portion of a datastream, said datastream including at least one data packet, said data packet including a cyclic redundancy check and a time value, said cyclic redundancy check capable of detecting errors in said data packet;

a peripheral device within said television system, said peripheral device capable of receiving said datastream, said datastream being contained within one of multiple VBI lines;

a processor located in said peripheral device, said processor capable of searching for said VBI line with said datastream, said processor capable of identifying a first byte in said data packet after said VBI line with said datastream is found, said processor capable of utilizing said cyclic redundancy check to determine if said data packet contains an error, said utilizing of said cyclic redundancy check occurring after said first byte is identified; and a memory located in said peripheral device, said memory storing said time value when said data packet is free of errors;

wherein said processor sets a time in said peripheral device, said processor using said time value stored in said memory to set said time.

18. The television system with automatic time set capability of claim 17, wherein said peripheral device is at least one of a television, a VCR, and a set-top box.

19. The television system with automatic time set capability of claim 17, wherein said time is displayed on a television.

20. The television system with automatic time set capability of claim 17, wherein said broadcasting is done with at least one of a satellite, a coax cable, a fiber optic cable, and a telephone line.

21. The television system with automatic time set capability of claim 17, wherein said utilizing of said cyclic redundancy check includes generating a value from said cyclic redundancy check with a polynomial.

22. A method for automatically setting the time in a television system with television schedule data, comprising the steps of:
- broadcasting a datastream with at least one data packet to a peripheral device, said datastream containing said television schedule data, said peripheral device being within said television system, said data packet including a cyclic redundancy check and a time value, said cyclic redundancy check capable of indicating errors in said data packet;
- identifying a first byte in said data packet with a processor located in said peripheral device;
- utilizing said cyclic redundancy check to determine if said data packet contains an error, said utilizing of said cyclic redundancy check occurring after said first byte is identified;
- storing said time value in a memory when said data packet is free of errors, said memory being located in said peripheral device;
- setting a time in said peripheral device with said processor, said processor using said time value stored in said memory to set said time;
- storing a portion of said television schedule data in said memory; and
- generating a television schedule guide with said television schedule data, said time being used in said generation of said television schedule guide.

23. The method of claim 22, wherein said broadcasting step includes the step of broadcasting said datastream in a VBI.

24. A method for automatically setting the time in a television system, comprising the steps of:
- broadcasting a datastream with at least one data packet to a peripheral device, said peripheral device being within said television system, said data packet including a cyclic redundancy check and a time value, said cyclic redundancy check capable of indicating errors in said data packet;
- identifying a first byte in said data packet with a processor located in said peripheral device;
- utilizing said cyclic redundancy check to determine if said data packet contains an error, said utilizing of said cyclic redundancy check occurring after said first byte is identified;
- storing said time value in a memory when said data packet is free of errors, said memory being located in said peripheral device; and
- setting a time in said peripheral device with said processor, said processor using said time value stored in said memory to set said time.

25. The method for automatically setting the time in a television system of claim 24, wherein said peripheral device is at least one of a television, a VCR, and a set-top box.

26. The method for automatically setting the time in a television system of claim 24, wherein said broadcasting is done with at least one of a satellite, a coax cable, a fiber optic cable, and a telephone line.

27. The method for automatically setting the time in a television system of claim 24, wherein said broadcasting is done by using the VBI provided within a satellite transmitted television channel.

28. A television system with automatic time set capability, comprising:
- a distribution center for compiling and broadcasting at least a portion of a datastream, said datastream including at least one data packet, said data packet including a cyclic redundancy check and a time value, said cyclic redundancy check capable of detecting errors in said data packet;
- a peripheral device within said television system, said peripheral device capable of receiving said datastream, said datastream being contained within a VBI line;
- a processor located in said peripheral device, said processor capable of identifying a first byte in said data packet, said processor capable of utilizing said cyclic redundancy check to determine if said data packet contains an error, said utilizing of said cyclic redundancy check occurring after said first byte is identified; and
- a memory located in said peripheral device, said memory storing said time value when said data packet is free of errors;
- wherein said processor sets a time in said peripheral device, said processor using said time value stored in said memory to set said time.

29. The television system with automatic time set capability of claim 28, wherein said peripheral device is at least one of a television, a VCR, and a set-top box.

30. The television system with automatic time set capability of claim 28, wherein said broadcasting is done with at least one of a satellite, a coax cable, a fiber optic cable, and a telephone line.

* * * * *